Feb. 3, 1953   T. KOULOMZINE   2,627,542
MAGNETOMETER
Filed Aug. 21, 1951

INVENTOR
Theodore Koulomzine
BY
Pennie, Edmonds, Morton & Barrows
ATTORNEYS

Patented Feb. 3, 1953

2,627,542

UNITED STATES PATENT OFFICE 2,627,542

MAGNETOMETER

Theodore Koulomzine, Val d'Or, Quebec, Canada

Application August 21, 1951, Serial No. 242,802

6 Claims. (Cl. 175—183)

The present invention relates to magnetometers and has for its object the provision of a new type of magnetometer. The invention is especially concerned with instruments used for the measurements of the gradients of the vertical component of the natural magnetic field.

The magnetometers proposed heretofore utilize either means for comparing the magnetic force to the gravity force or electrical coils for measuring the magnetic flux passing through these coils.

I introduce a third counterbalancing force which is uniform and comparable to the force of gravity in order that the center of application of this force is fixed in a definite position.

My invention provides magnetometers having their moving systems suspended in a liquid which gives a buoyant force in opposition to the force of gravity. One important feature of the invention, regardless of the means of attachment used, is that the moving system is suspended in a non-compressible medium, and since it has substantially zero weight in the liquid, it has no inertia. Consequently, the usual rough handling that the instrument must undergo does not result in damage to the springs holding the moving system in a predetermined position.

In my invention, I provide a magnetometer having a balance system comprising a strong permanent magnet mounted in or attached to a float or buoyant member in which the center of gravity is located below the center of buoyancy, the north pole below the south pole and center of gravity, and both poles, center of gravity and center of buoyancy embracing a common vertical plane, preferably a line. The balance system is supported by means which retain it in equilibrium at a zero point when in a normal magnetic field. In this aspect of my invention, I prefer to use an elongated upright vessel for confining the suspending liquid, and I support the balance system within the liquid on equalizing resilient members such as springs, one attached to the top and one to the bottom, whereby the balance system is supported at the said zero point. In other words, this symmetrical system immersed in a liquid assumes a vertical position making it possible to measure the gradient of the vertical component of the natural magnetic field against the elongation of the supporting springs without the necessity of orienting the instrument in any particular vertical plane.

These and other novel features of the invention will be better understood after considering the following discussion taken in conjunction with the accompanying drawings, in which.

Figure 1:
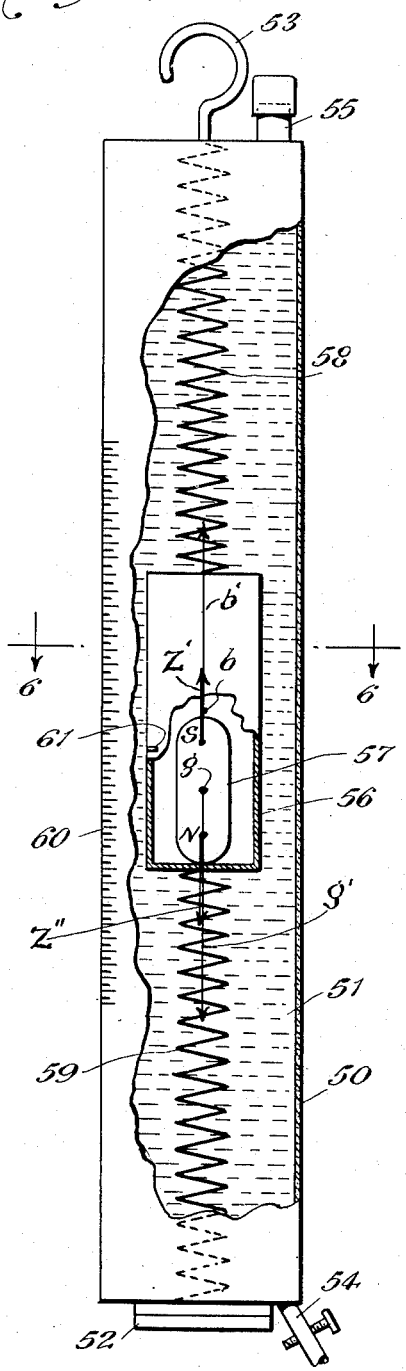
Fig. 1 is a side elevation with parts in section of my invention.
Figure 2:
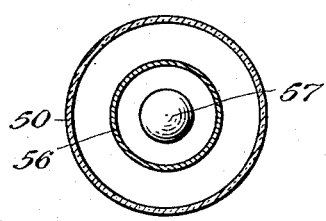
Fig. 2 is a sectional view along the line 6—6 of Fig. 1.

The magnetometer illustrated in the drawings comprises an elongated vessel 50 for confining the liquid 51. The bottom of the vessel has a rotary member 52 by means of which the meter may be attached to a tripod or the like and a hook 53 at the top for suspending the meter. There is a drain cock 54 at the bottom for removing the liquid and a capped filling opening 55 at the top.

The balance system comprises a hollow float 56 formed of metal and within which the permanent magnet 57 is mounted in the lower portion. This magnet is preferably one having high magnetic flux density such as a magnet formed of aluminum-nickel alloy. All the other parts of the meter are of non-magnetic metals or other suitable materials. The center of gravity $g$ of the float with its contained magnet 57 is appreciably below the center of buoyancy $b$ thereof and advantageously also below the south pole S. The average density of the balance system is equal to or substantially equal to the density of the liquid selected for use in the meter. As a liquid I may use water, an alcohol, acetone, glycol, carbon tetrachloride, or any suitable solution thereof to obtain the density required. As thus constructed, the balance system is self aligning because its center of gravity is well below its center of buoyancy, the arrow $b'$ represents the force of buoyancy, the arrow $g'$ the force of gravity, $Z'$ the upward vertical component and $Z''$ the vertical downward component of the earth's magnetic field. The arrows $Z'$ and $Z''$ are shown greatly exaggerated since the forces are quite feeble in comparison to the force of gravity. Two very weak non-magnetic coil springs 58 and 59 attach the balance system both top and bottom, respectively, to the vessel 50. These springs are just sufficiently strong to support the balance system in its zero position when the meter is held in an upright position and in a normal magnetic field. Under the influence of a gradient of the magnetic field, the balance system is pulled either up or down and its movements can be registered by any suitable means, either by direct visual observation or by optical or electrostatic devices comparable to those used in modern gravity meters. In the embodiment of the invention illustrated, the vessel 50 may be of glass or some suitable translucent plastic material such as Vinylite, or methacrylate resins, preferably cylindrical in cross section, in which the balance system can be observed from the outside. A suitable index 60 may be marked on the outside and a comparison point 61 placed on the balance system.

Among the advantages of this embodiment of my invention are its extreme simplicity, low cost, relative freedom from injury, and simplicity of use. It is not necessary to mount this meter on the usual carefully aligned supporting structures, such as tripods, for the purpose of orientation because orientation is not necessary in making determinations. I may, accordingly, merely suspend the meter on a string attached to the hook 53 and make direct readings. In the presently known vertical magnetometers, the measurements can only be properly made after the meter has been leveled and aligned either in the magnetic meridian or at right angles to it.

This application is a continuation-in-part of my United States Letters Patent No. 2,590,184.

I claim:

1. A magnetometer which comprises a vessel for confining a liquid, a balance system immersed in the liquid including a float, a strong permanent magnet attached to the float, the center of gravity of the balance system being at a lower level than the center of buoyancy thereof, the north pole of the magnet being below and the south pole thereabove, resilient means for supporting the balance system in a predetermined position when in a normal magnetic field, and means for observing the displacement of the balance system in a magnetic field.

2. A magnetometer according to claim 1 which comprises means for hanging the magnetometer in a depending position to make determinations without orientation.

3. A magnetometer according to claim 1 in which the resilient means are sufficiently strong to support the balance system in zero position when the magnetometer is held in an upright position in a normal magnetic field.

4. A magnetometer which comprises a vessel for confining a liquid, a balance system immersed in the liquid including a float, a permanent magnet secured to the lower portion of the float, the north pole being below and the south pole being directly above both the center of gravity and the north pole, two non-magnetic very weak springs one attached to the top of the float and the other spring attached to the bottom, means for anchoring both springs in such positions that they exercise a tensional force in the direction of a line embracing the poles, whereby the springs hold the balance system in a predetermined position when in a uniform magnetic field and means for observing the displacement of the balance system in a magnetic field.

5. A magnetometer which comprises an elongated vessel at least partly transparent with means for confining a liquid, means for supporting the vessel in an upright position, a liquid of predetermined density in the vessel, a balance system immersed in the liquid and comprising a hollow float, a strong permanent magnet mounted at the lower end portion of the float, the north pole being below the south pole and the north pole, south pole, center of gravity and center of buoyancy all substantially embracing a common vertical plane, preferably a vertical line when the meter is in operating position, the mass of the balance system being substantially equal to the mass of the displaced liquid, a weak non-magnetic spring connecting the upper part of the balance system to the vessel and another weak non-magnetic spring connecting the lower portion of the balance system to the vessel, whereby the balance system is held in a predetermined position when the magnetometer is in a normal magnetic field.

6. A magnetometer according to claim 5 which comprises a vessel in the form of a long narrow enclosed tube formed of transparent plastic material and an elongated float of considerably smaller diameter than the diameter of the vessel, whereby the position of the float can be seen from the outside.

THEODORE KOULOMZINE.

REFERENCES CITED

The following references are of record in the file of this patent:

UNITED STATES PATENTS

| Number | Name | Date |
|---|---|---|
| 1,328,187 | Oakley | Jan. 13, 1920 |
| 2,153,565 | Isaacson | Apr. 11, 1939 |